Nov. 11, 1924.  
C. C. JACK  
REAMER  
Original Filed Oct. 4, 1919  
1,514,704

Witness  
B. L. Baker.

Inventor  
Cornelius C. Jack  
by Van Everen Fish & Hildreth  
Attys

Patented Nov. 11, 1924.

1,514,704

UNITED STATES PATENT OFFICE.

CORNELIUS C. JACK, OF VICTOR, NEW YORK.

REAMER.

Application filed October 4, 1919, Serial No. 328,401. Renewed April 7, 1924.

*To all whom it may concern:*

Be it known that I, CORNELIUS C. JACK, a citizen of the United States, residing at Victor, in the county of Ontario and State of New York, have invented certain new and useful Improvements in Reamers; and I do hereby declare the following to be a full, clear, and exact description of the invention, such as will enable others skilled in the art to which it appertains to make and use the same.

The invention relates to reamers or combination drill and reamers.

The object of the invention is to provide a tool which will enable work to be produced more rapidly and with greater ease than is practicable with the tools and methods heretofore in common use.

In enlarging a hole in metal either from a rough or cored hole, or from a hole previously machined, it is the usual practice to first use a boring tool or drill and then follow with a chucking reamer, after which the hole is finished with a hand reamer if practically perfect work is to be produced.

The tool of the present invention enables even a rough or cored hole to be directly cut to size and finished at a single operation with a resulting increase in the speed of production and reduction in the cost. This is accomplished by providing the tool with supporting or centering and supporting lands extending lengthwise of the tool and parallel or substantially parallel to the cutting edges. The lands preferably correspond in number to the cutting edges and are arranged to support and center the tool during the cutting so that the cutting edges may cut freely without springing away from the work and causing a binding or chattering of the tool.

Figure 1:
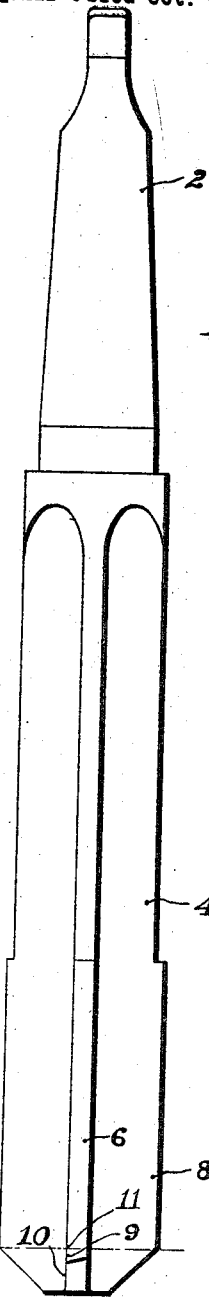
Figure 3:
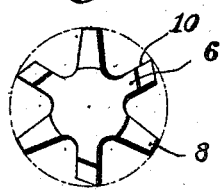
Figure 4:
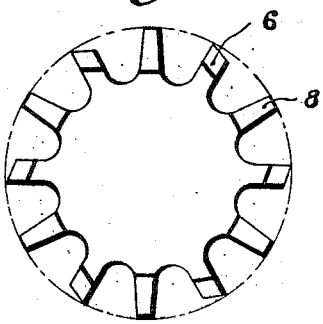
Figure 5:
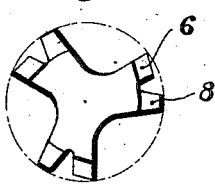
Figure 2:
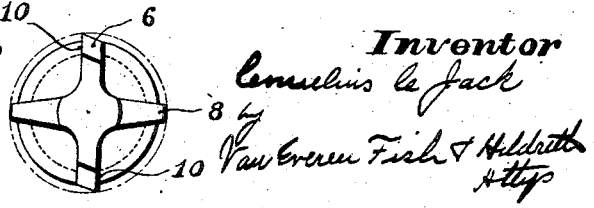

The invention will be readily understood from an inspection of the drawing, in which Fig. 1 is a side view of a combined drill and reamer embodying the invention; Fig. 2 is an end view of the tool; and Figs. 3, 4 and 5 are end views showing different arrangements of cutting edges and lands.

As shown in the drawings the tool comprises a shank 2 and a body 4 which is fluted to form cutting ribs 6 and intermediate ribs 8. The ribs 8 are provided with comparatively narrow cylindrical bearing surfaces or lands adapted to engage and readily slide over the interior of the hole within which the tool is operating and thus support and back up the cutting edges. The cutting ribs may therefore be given the radial clearance back of the cutting edge best suited to give a free and rapid cutting action when operating on the kind of metal for which the tool is intended. This is an important factor in determining the speed of the tool. The diameter of the supporting lands is the same as the diameter of the cutting edges so that the lands form in effect backing rests for holding the cutting edges up to the work thus ensuring the free and uniform cutting actions requisite for producing a hole of accurate size and superior finish. The ribs 8 terminate short of the ribs 6 so that the cutting edges extend somewhat beyond the ends of the supporting lands, as indicated at 9, Fig. 1. This governs the rate of speed of the tool since the engagement of the end of a rib 8 with the shoulder formed by the corner of the preceding cutting edge will limit the advance of the tool during that part of a revolution determined by the distance of the land back of the cutting edge. This will also prevent the "drawing in" of the tool and ensure its proper action at the speed determined by the distance 9. The tool should be ground, therefore, to give a distance 9 best suited to the character of the metal to be operated upon. This feature is not confined in its application to reamers but may be embodied in other forms of boring tools.

The wear comes upon the active portion of the cutting edges which is in advance of the ends of the lands, so that during continued use the end of the tool will wear off tapered from the point indicated at 11, Fig. 1. The edges above the point 11 can have nothing more than an infinitesimal finishing action and will not be subjected to any appreciable wear. When the tool becomes dull the edges along the portion 9 may be reground, and as occasion requires the ends of the ribs, both cutting and lands, may be ground back to give a new cutting portion 9 which is unworn and of accurate size.

The invention is applicable to tools which are either straight or spirally fluted and which are provided with any desirable number of cutting edges. In the case of tools having two diametrically opposite cutting edges the supporting lands are preferably located diametrically opposite each other and midway between the cutting edges as shown in Fig. 2 so that they will center the tool as well as hold the cutting edges up to the work. In the case of tools having three or more cutting edges the lands are preferably arranged midway between the cutting ribs, as indicated in Figs. 3 and 4, and will afford a support diametrically opposite each cutting edge or approximately so. In the case of tools intended for use on the softer metals where the amount of metal to be removed may be considerable in proportion to the size of the hole, the supporting lands may with advantage be arranged nearer to the cutting edges, as indicated in Fig. 4, thereby giving additional chip room in front of the cutting edges.

The invention may be embodied in a tool constructed to act merely as a reamer, but is of particular advantage in a combined drill and reamer of the type shown in which the ends of the cutting ribs are shaped to form cutting lips 10.

What is claimed is:

1. A reamer provided with cutting edges and one or more longitudinal supporting lands for holding the cutting edges up to the work, the supporting lands being arranged to terminate at such distance short of the ends of the cutting edges that during the use of the tool the non-cutting ends of the supporting lands cooperate with the work to limit the feed of the reamer through the work to a degree conducive to the production of a rapid cutting tool.

2. A reamer having cutting ribs provided with cutting edges and radial clearance back of the edges, and intermediate ribs provided with supporting surfaces or lands, said supporting lands being arranged to terminate short of the ends of the cutting ribs to thereby cooperate with the work to limit the feed of the reamer through the work to a degree conducive to the production of a rapid cutting tool.

3. A combined drill and reamer having cutting ribs provided with cutting edges and lips, and intermediate ribs provided with supporting surfaces or lands, said supporting lands being arranged to terminate short of the ends of the cutting ribs to thereby cooperate with the work to limit the feed of the reamer through the work to a degree conducive to the production of a rapid cutting tool.

4. A boring tool having cutting lips and ribs intermediate the cutting lips provided with supporting surfaces or lands which terminate short of the cutting lips, the ends of said intermediate ribs being arranged so as to cooperate with the work to limit the feed of the boring tool through the work to a degree conducive to the production of a rapid cutting tool.

CORNELIUS C. JACK.